(No Model.)

W. STEPHENS.
PLOW.

No. 573,368. Patented Dec. 15, 1896.

Witnesses.
Robt Everett.
Thos. A. Gunn

Inventor.
William Stephens.
By James L. Norris.
Atty.

UNITED STATES PATENT OFFICE.

WILLIAM STEPHENS, OF FRANKLIN, TEXAS.

PLOW.

SPECIFICATION forming part of Letters Patent No. 573,368, dated December 15, 1896.

Application filed May 9, 1896. Serial No. 590,960. (No model.)

*To all whom it may concern:*

Be it known that I, WILLIAM STEPHENS, a citizen of the United States, residing at Franklin, in the county of Robertson and State of Texas, have invented new and useful Improvements in Plows, of which the following is a specification.

This invention relates to plows, and has for its object to provide an improved plow of simple and inexpensive construction employing two shovels so arranged and attached that either one may be quickly and easily removed to convert the plow into either a right or left hand plow, and has for its further object to provide a plow especially designed for opening new ground wherein the plowing is rendered difficult by the presence of roots and similar growth.

To these ends my invention consists in the features and in the construction or arrangement of parts hereinafter described, and pointed out in the claims following the description, reference being had to the accompanying drawings, forming a part of this specification, wherein—

Figure 1:
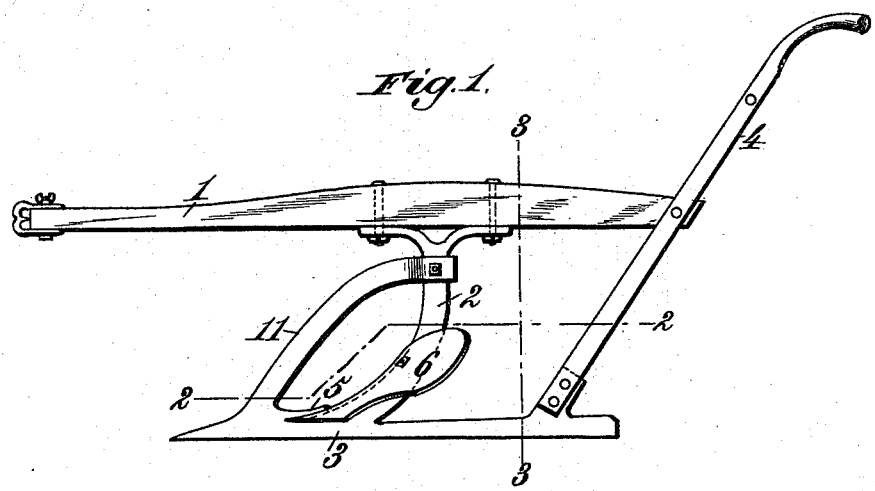
Figure 2:
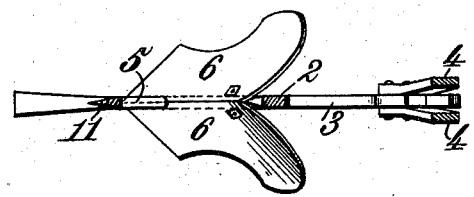
Figure 3:
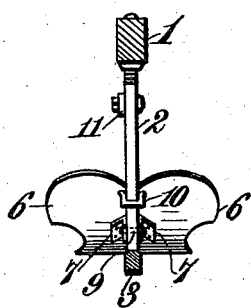
Figure 4:
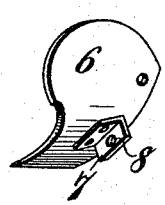
Figure 5:

Figure 1 is a side elevation of my improved plow. Fig. 2 is a horizontal section on the line 2 2 of Fig. 1. Fig. 3 is a rear plan view. Fig. 4 is a rear perspective view of one of the shovels. Fig. 5 is a detail view of the clip.

Referring to the drawings, the numeral 1 indicates the plow-beam of ordinary or usual construction, to which is attached the standard 2. Said standard is preferably formed on the arc of a circle, and at its lower end is attached to or formed integrally with the plow-runner 3, and to the rear end of the latter are attached the handles 4, which are also attached to the rear end of the beam 1.

Formed on the lower end of the standard 2 is an upwardly and rearwardly curved nib or finger 5, under which are adapted to be fitted the forward ends of the shovels 6. Each of said shovels is provided on its under side with a bracket 7, consisting of a plate bent substantially at a right angle and secured to the shovel by bolts or rivets, and provided with bolt-holes 8, which register with corresponding bolt-holes 9, formed in the standard 2. The shovels 6 are attached to the standard by means of bolts passed through said apertures, and are further held in place by a U-shaped clip 10, that is attached at its ends to said shovels and embraces the standard 2. By unfastening or detaching the fastening-bolts and clip either one of the shovels may be removed to convert the plow into a right or left hand plow, or both shovels may be used to form a double-moldboard plow.

Projecting upwardly from the point of the runner 3 is a colter 11, that is preferably curved or bowed toward the front of the plow, and at its rear end is bolted to the standard 2. Said colter is sharpened or formed with a knife-edge on its forward side, and is united to the runner 3 at a point immediately in front of the nib or finger 5. This colter is especially designed for opening up new ground and operates to cut the roots and other growth. This colter also acts as a guard to protect the nib or finger 5 from rupture or injury, and also operates to open up the furrow in advance of the shovels.

By the described method of attaching the shovels to the runner and standard they may be easily and quickly removed or replaced for the purpose above described, or said shovels may be removed and shovels or plows of a different type may be substituted. By constructing and attaching the colter in the manner shown and described the standard is braced and strengthened, enabling the plow to be run through ground thickly grown with roots and the like.

By providing a variety of shovels, moldboards, sweep-stocks, and the like the plow may be utilized for all the different kinds of plowing found necessary in the tillage of the soil, rendering the employment of a number of different plows unnecessary.

Having described my invention, what I claim is—

1. In a plow, the combination with the runner 3 and standard 2, of the curved nib or finger 5 formed on the forward end of the runner, shovels 6 fitted at their forward ends under said nib or finger, L-shaped brackets 7 removably bolted to the under side of the shovels and to the opposite sides of the standard, and a U-shaped clip 10 embracing the standard and removably attached at its ends to the shovels, substantially as described.

2. In a plow, the combination with the runner 3 and standard 2, of a curved nib or finger 5, formed on the forward end of the runner in front of the standard, a shovel fitted at its forward end under said nib or finger and provided with means for attachment to the standard, and a colter 11 attached at its lower end to the forward end of the runner in advance of the nib or finger, and fastened at its upper end to the upper end of the standard, substantially as described and for the purpose specified.

In testimony whereof I have hereunto set my hand in presence of the subscribing witnesses.

WILLIAM $\overset{\text{his}}{\times}$ STEPHENS.
$\phantom{WILLIAM \times}$ mark Witnesses:
   JOHN E. CRAWFORD,
   E. H. TRIM,
   K. TONQUET,
   P. B. GRICE.